United States Patent [19] [11] 3,953,770
Hayashi [45] Apr. 27, 1976

[54] SAFETY EQUIPMENT FOR MACHINERY USED IN PROCESSING PLATES, ETC.
[76] Inventor: Jinnosuke Hayashi, No. 22-5, 2-chome, Nakai, Shinjuku, Tokyo, Japan
[22] Filed: Jan. 2, 1975
[21] Appl. No.: 538,119

[30] Foreign Application Priority Data
July 11, 1974 Japan.............................. 49-78714
Oct. 3, 1974 Japan....................... 49-118791[U]
Nov. 27, 1974 Japan....................... 49-142737[U]

[52] U.S. Cl. .............................. 317/146; 192/130; 307/116; 317/DIG. 2
[51] Int. Cl.² ...................................... H01H 47/12
[58] Field of Search ...................... 317/146, DIG. 2; 340/258 C, 258 D; 192/129 A, 130, 133, 134; 307/116, 125

[56] References Cited
UNITED STATES PATENTS
2,490,679 12/1949 Davidson ........................... 192/130
3,177,481 4/1965 Joy et al. ....................... 317/DIG. 2
3,497,995 3/1970 Forsberg ......................... 340/258 C OTHER PUBLICATIONS
"Wagner Stops Punch–Press Accidents," Holtzman, American Machinist, 1950, pp. 97–100.

Primary Examiner—J. D. Miller
Assistant Examiner—Harry E. Moose, Jr.
Attorney, Agent, or Firm—Saul Jecies

[57] ABSTRACT

Safety equipment for machinery used in processing plates, etc., such as presses and shearing machines which are operated with great power, where, lest the operator's hands, fingers or some other part of the body be caught or cut because of an error in his operation of these machines for processing plates, etc., an insulating mat in which a wire netting is embedded is placed for supporting the operator in front of the machine for processing plates, etc., and high-frequency electric power is applied to said wire netting from a high-frequency electric power source in such a manner that a high-frequency electric field may be formed around the operator standing on the mat, that the said high-frequency electric field may be sensed by an antenna installed adequately in the vicinity of the danger zone of the machine for processing plates, etc., and as the operator's body approaches said zone, that a signal from the high-frequency electric field may be sent to a high-frequency receiver and that the output of the receiver may be transmitted to an electronic switch, making it possible to control the machine for processing plates, etc., for safety purposes and a safety tester for said safety equipment used in the operation of machinery for processing plates, etc., which is used for checking whether or not the said safety equipment for the machinery used in processing plates, etc., works satisfactorily before their operation is started.

4 Claims, 5 Drawing Figures

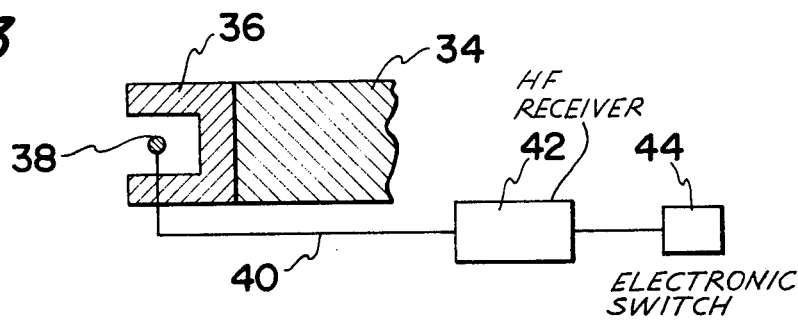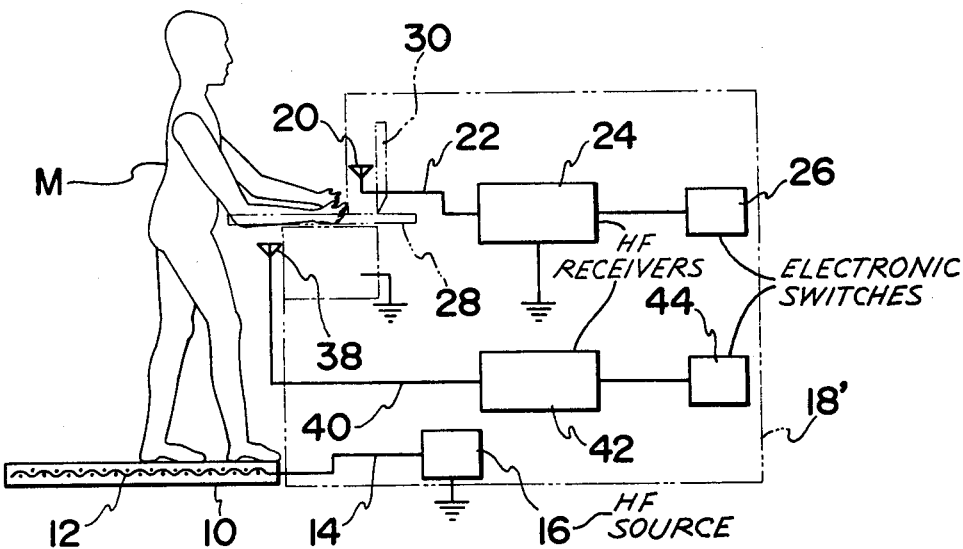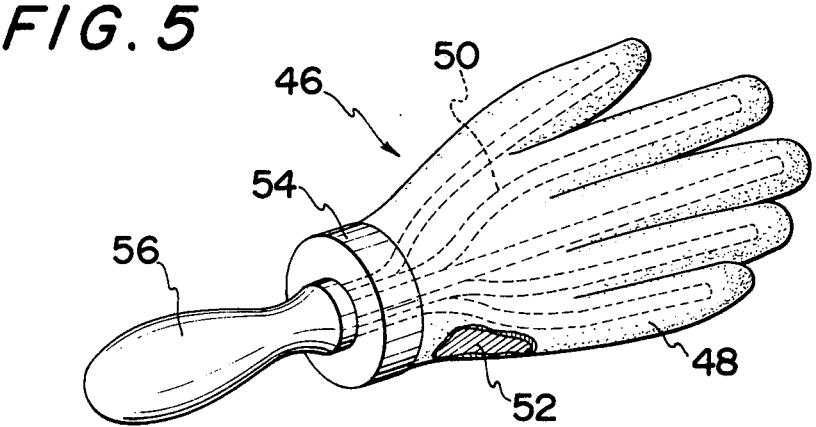

SAFETY EQUIPMENT FOR MACHINERY USED IN PROCESSING PLATES, ETC.

BACKGROUND OF THE INVENTION

The present invention relates to safety equipment used on machinery for processing plates, etc., such as presses and shearing machines, where physical injury of the operator is prevented by controlling the machinery for safety purposes if any part of the operator's body approaches the danger zone of the machinery and to a safety tester for checking whether or not the said safety equipment on the machinery for processing plates, etc., works satisfactorily.

When machinery for processing plates, etc., such as presses and shearing machines operates with great power, it is well known that the operator faces the danger of receiving a serious injury as part of his body such as the hands and fingers might be caught by the machinery if the operator operates the machinery in error.

In order to prevent such danger, various inventions (devices) have been presented to date, but these devices have the defect of being unsatisfactory in confining the operator's free activities. For instance, in a mechanical safety device, a netting is provided covering the danger zone so as to allow only the material to pass for processing. In this case, however, the safety equipment netting must be changed every time the processing material is changed. Moreover, although the operator appears to be safe as he is separated from the machine by the safety device, attention should be paid to the fact that it is safer to keep the space between the machine and the operator as free as possible. On the other hand, in an optical safety device, the danger zone of the machine is illuminated and a photoelectric switch works to stop the machine when the operator's hand enters the illuminated zone. In this case, however, it is impossible to distinguish the operator's hand from the material in process and the safety device may often work unnecessarily. Moreover, it may also operate because of light sources external to the safety device. On account of these defects, it is of low reliability and not very satisfactory as a safety device.

SUMMARY OF THE INVENTION

In view of the above mentioned defects, the purpose of the present invention is to offer safety equipment for machinery to process plates, etc., that controls these machines for safety purposes without fail whenever a part of the operator's body approaches the danger zone of these machines beyond a certain limit.

Another purpose is to offer a safety tester for checking whether or not the said safety equipment works properly and without fail.

To achieve the first purpose mentioned for the present invention, an insulating mat with a wire netting embedded in it is laid for supporting the operator in front of the machine for processing plates, etc. and high-frequency electric power is applied to the said wire netting from the output terminal of a high-frequency electric power source. Also, an antenna with a high-frequency receiver connected to it is installed close to the zone dangerous to the operator's body of the said machine for processing plates, etc. Thus, whenever the high-frequency electrical field of the operator standing on the said insulating mat is sensed by the antenna, it will be received by the high-frequency receiver and an electronic switch will receive the output from the receiver and operate to control the processing machine for plate work, etc. to cause an emergency stop for safety purposes.

In order to increase the reliability of the safety equipment, an auxiliary antenna is installed as an auxiliary safety device in front of the processing machine for plate work, etc., so as to work alarms, etc., and to cause an emergency stop of the machine for safety purposes if the said high-frequency electric field is interrupted, that is, grounded, and is not sensed by the antenna such as in such a case when the operator works without wearing gloves or when any part of the operator's body contacts the processing machine for plate work, etc. directly.

In order to achieve the second purpose mentioned above, a safety tester is embodied in the present invention. It is made of material having an electrical conductivity almost the same as that of the human body and of a shape and size similar to a part of the body part, such as the hand, and is provided with an electrically condutive handle.

The abovementioned and other purposes, features and performance of the present invention may be understood from the following explanations, giving examples of applications, and referring to the drawings attached.

BRIEF DESCRIPTION OF THE DRAWINGS

FIG. 3 represents a sectional view along the line III—III of FIG. 2.

FIG. 4 represents a block diagram of the application shown in FIG. 2.

FIG. 5 represents a diagonal view of the safety system tester of the present invention.

DESCRIPTION OF THE PREFERRED EMBODIMENTS

Figure 1:
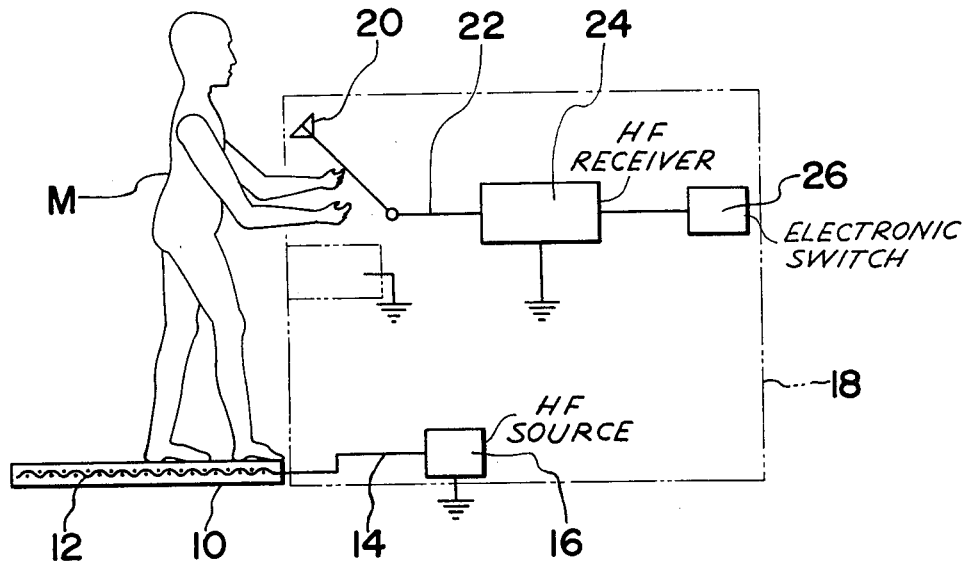
FIG. 1 represents a block diagram showing the principle of the safety equipment of the present invention.

In FIG. 1, an electrical block diagram is given to show the principle of the present invention.

An insulating mat 10 placed for supporting the operator M in front of a shearing machine, press or any other processing machine 18 for plate work, etc., has embedded in it an insulated wire netting 12, being connected to a high-frequency electric power source 16 through a shielded cable 14. An antenna 20 stretching over the danger zone of the processing machine 18 for plate work, etc., is connected to a high-frequency receiver 24 and an electronic switch 26 through a shielded cable 22.

Thus, when high-frequency electric current generated from the high-frequency electric power source 16 is supplied to the wire netting 12 of the insulating mat 10, a high-frequency electric field will be formed around the operator M standing on the said insulating mat 10. In this case, whenever the operator M approaches to within a certain distance from the antenna 20, the high-frequency electric field will be sensed without fail, and a signal will be sent to the resonant circuit of the high-frequency receiver 24 through the shielded cable 22, so that an output for activating the electronic switch 26 may be produced from the receiver 24 through conventional amplification and detection circuits, etc.

Figure 2:
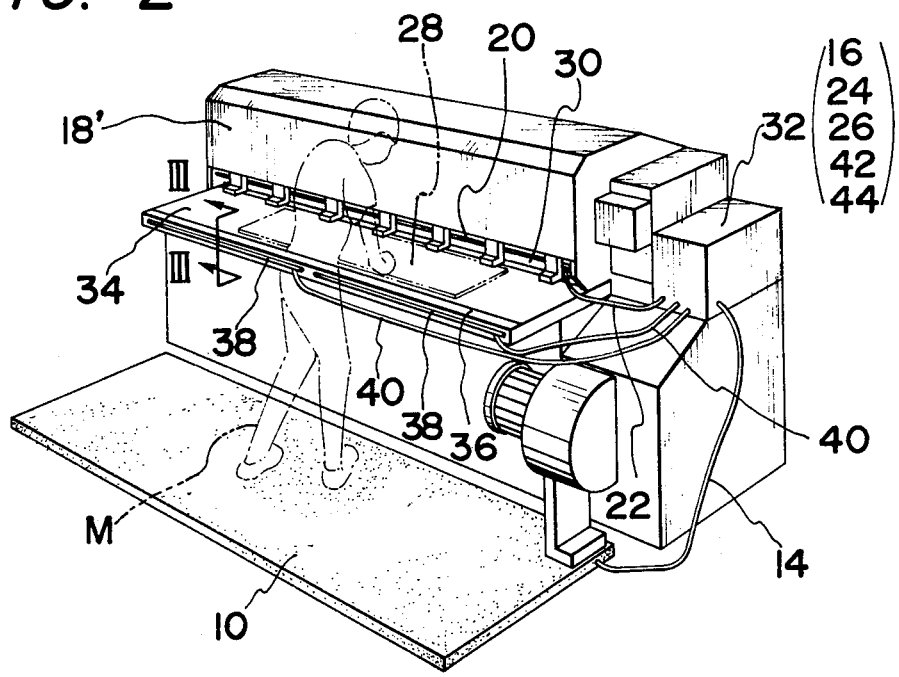
FIG. 2 represents a diagonal view showing the application of the safety equipment.

Next, a detailed explanation will be made, further referring to FIG. 2 regarding an application example where the safety equipment of the present invention is attached to a shearing machine 18'. The operator M feeds a metal plate 28 into the machine and it is cut by means of a blade 30 moving vertically. When the switch is turned on, the blade 30 comes down powerfully to cause the shearing and then lifts and stops. An antenna 20 is stretched in front of the blade 30 of this shearing machine 18', being connected to the control box 32 of the safety equipment through a shielded cable 22. In addition, an auxiliary antenna 38 (Refer to FIG. 3) surrounded by an open-front box-type shield 36 at the head of the table 34 is installed, being connected through a shielded cable 40 to a high-frequency receiver 42 in the control box 32 so as to activate an electronic switch 44.

An electric block diagram of this application example is given in FIG. 4. According to this application example, a high-frequency voltage generated from the high-frequency electric power source 16 is applied to the wire netting 12 of the insulating mat 10 through a shielded cable 14, while, since the antenna 20 stretching over the danger zone of the shearing machine 18' is connected through a shielded cable 22 to the high-frequency receiver 24 and further to an electronic switch 26, whenever any part of the body of the operator M standing on the insulating mat 10 approaches to within a certain distance of the antenna 20, the high-frequency electric field formed around the operator M will be sensed and the output signal of the high-frequency receiver 24 will activate the electronic switch 26 to stop the shearing machine 18' safely. In this case, if the operator M wears no gloves or his gloves are torn, and if a part of his body directly contacts the shearing macine 18', the said high-frequency electric field will be grounded and not be radiated. A signal will be sent, however, from the auxiliary antenna 38 to the high-frequency receiver 42 through the shielded cable 40 so as to produce an output from the high-frequency receiver 42 if the auxiliary antenna 38 senses no high-frequency radiation. Since the output is converted by means of the electronic switch 44 into sound, light or some other signal (e.g., a buzzer or lamp), an alarm is produced indicating that the main safety equipment does not work. This ensures the proper performance of the safety equipment.

The said insulating mat 10 which is placed in front of the processing machine 18 for plate work, etc., may also be hung on the opposite wall against the processing machine 18. In this case, if a voltage about 3 times as high as that of the former case is applied, the same effect is produced as when the operator M works standing on the said mat 10.

FIG. 5 shows a safety tester 46 for checking the safety of the safety equipment of the present invention. A glove-like shell 48 made of rubber, PVC or some other insulating material reinforced with a framework 50 of wood, bamboo or metalic material for rigidity is filled with materials 52 having the same electrical conductivity as flesh and blood such as aqueous sodium chloride solutions or pieces of light metal, its open end being tightly closed with a cover 54 made of an electrically conductive material such as light metal, so as to produce a shape and electrical properties similar to those of the human hand. In addition, a handle 56 is formed as an extention of the said cover 54 so as to enable operator M to handle it easily. This safety tester is used for checking the performance of the said safety equipment of the present invention. In the use of the safety equipment, since the operator M stands on an insulating mat 10 in which is embedded in it a wire netting 12 which is connected to a high-frequency electric power source 16, a high-frequency electric field is formed around the body of the operator M. Also, since an antenna 20 stretches over the danger zone of the shearing machine 18' and is connected to a high frequency receiver 24 and an electronic switch 26, the safety equipment with work to stop the shearing machine 18' safely as abovementioned whenever a part of the operators body M approaches the antenna 20. In the same manner, when the operator M holds the handle 56 of the tester 46, and electric field similar to that of the operator M will be formed around the shell 48 through the electrically conductive handle 56, cover 54 and electrically conductive material 52 (and also through the reinforcing framework 50 if it is made of metal). Thus, whenever the tester 46 is brought close to the danger zone of the shearing machine 18', the antenna 20 will sense its electric field and operate the safety equipment. The proper performance of the safety equipment, therefore, may be confirmed by extending this tester 46 into the danger zone of the machine during operation. Should the safety equipment fail to work, the operator M will be free from injury because of the use of this tester 46.

The material for processing is placed on the table 34 of the processing machine 18 and does not receive any energy, i.e. the high-frequency electric field, from its lower support, while the operator M receives energy, due to the high-frequency electric field, from the insulating mat 10. This difference distinguishes the operator from the material. If the operator holding the material floated in mid-air, the material would produce the same effect as the operator, because the energy (the high-frequency electric field) would be transmitted from the operator to the material. When the material is held by a hand wearing a glove, the energy (the high-frequency electric field) is transmitted indirectly to the material. Upon its contact with the table, however, its voltage becomes equal to that of the table and it cannot be sensed by the antenna of the safety equipment, whereas the hand wearing a glove does not lose its energy and, as it approaches the danger zone, the machine will make an emergency stop.

According to the present invention, therefore, processing machinery for plate work, etc., may be stopped for safety purposes without fail, and the performance of the safety equipment itself may also be checked in a short time.

Explanation has been made hitherto of the preferred embodiments as stated above, but it is clear that a number of modifications and variations may be practiced without deviating from the principle of the present invention. It is hoped, therefore, that all modifications and variations which produce the effect of the present invention by using equipment substantially the same or equivalent to the category of the present invention will be covered by the following claim.

What is claimed is:

1. A safety device for machinery, particularly machinery for processing plates and the like, comprising an insulating mat having an embedded electrically conductive grid and being adapted to carry an operator who is in working position adjacent to the machine; safety means for stopping the machine in the event part of the operator's body approaches a dangerous area of the machine, comprising a first source of high-frequency electrical energy connected to said grid so that a high-frequency field is formed about the body of the operator on said mat, a first antenna on said machine and positioned to sense said field when part of the operator's body approaches said dangerous area and to generate a first signal, and first means for stopping said machine in response to generation of said first signal: and fail-safe means comprising a second antenna on said machine and operative to sense an absence of said field about the operator's body and in response to generate a second signal, and second means for stopping said machine in response to generation of said second signal.

2. A safety device as defined in claim 1, wherein said first means comprises a first receiver positioned to receive said first signal and to convert it into a first electrical impulse, and a first safety switch connected with said first receiver to receive said first impulse and shut down said machine; said second means comprising a second receiver positioned to receive said second signal and to convert it into a second electrical impulse, and a second safety switch connected with said second receiver to receive said second impulse and shut down said machine.

3. A safety device as defined in claim 2, wherein said second antenna mounted on said machine is located closer to the body of the operator than said first antenna.

4. A safety device as defined in claim 1; and further comprising a tester for testing the operational readiness of said device, having an electrically conductive handle and an electrically conductive model formed at the opposite side of said handle to resemble a part of a human body and is identical thereto in its electrical properties, said model being attached and electrically connected to said handle.

* * * * *